(12) United States Patent
Seok et al.

(10) Patent No.: US 9,877,284 B2
(45) Date of Patent: Jan. 23, 2018

(54) METHOD OF COMMUNICATION BASED ON POWER SAVE MODE IN WIRELESS LOCAL AREA NETWORK AND APPARATUS FOR THE SAME

(75) Inventors: Yong Ho Seok, Anyang-si (KR); Jong Hyun Park, Anyang-si (KR); Eun Sun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 324 days.

(21) Appl. No.: 14/232,583

(22) PCT Filed: Feb. 24, 2012

(86) PCT No.: PCT/KR2012/001416
§ 371 (c)(1),
(2), (4) Date: Jan. 13, 2014

(87) PCT Pub. No.: WO2013/008989
PCT Pub. Date: Jan. 17, 2013

(65) Prior Publication Data
US 2014/0177501 A1    Jun. 26, 2014

Related U.S. Application Data

(60) Provisional application No. 61/508,018, filed on Jul. 14, 2011.

(51) Int. Cl.
*H04W 52/02* (2009.01)
*H04W 84/12* (2009.01)
(Continued)

(52) U.S. Cl.
CPC ... *H04W 52/0241* (2013.01); *H04W 52/0216* (2013.01); *H04W 48/20* (2013.01); *Y02B 80/50* (2013.01)

(58) Field of Classification Search
CPC .................................................. H04W 52/0241
(Continued)

(56) References Cited

U.S. PATENT DOCUMENTS

2005/0136914 A1* 6/2005 van Kampen .... H04W 52/0216
455/426.2
2005/0254459 A1   11/2005 Qian
(Continued)

FOREIGN PATENT DOCUMENTS

EP          1734698 A1    12/2006
JP       2005065085 A     3/2005
(Continued)

OTHER PUBLICATIONS

P. Sandhya, et al.: "DL MU TXOP Power Save", XP-017675901, IEEE Draft, IEEE-SA Mentor, vol. 802.11ac, Piscataway, NJ, US, Nov. 8, 2010.
(Continued)

*Primary Examiner* — Andrew Chriss
*Assistant Examiner* — Voster Preval
(74) *Attorney, Agent, or Firm* — Dentons US LLP

(57) ABSTRACT

A communication method based on a power save mode, performed by a station (STA) in a wireless local area network (WLAN) system is provided. The method includes switching to an awake state; transmitting a wakeup poll frame to an access point (AP) the wakeup poll frame indicating that the station has switched to the awake state; receiving a wakeup confirm frame from the AP in response to the wakeup poll frame, the wakeup poll frame including an awake duration field, the awake duration field indicating an awake duration as a duration in which the station maintains the awake state; and switching to a doze state after the time interval indicated by the awake duration field has lapsed.

8 Claims, 11 Drawing Sheets

(51) Int. Cl.
*H04W 84/18* (2009.01)
*H04W 48/20* (2009.01)

(58) Field of Classification Search
USPC .......................................................... 370/311
See application file for complete search history.

(56) References Cited

U.S. PATENT DOCUMENTS

| | | | | |
|---|---|---|---|---|
| 2007/0115882 | A1* | 5/2007 | Wentink | H04N 21/4126 370/329 |
| 2008/0146253 | A1* | 6/2008 | Wentink | H04W 52/0216 455/458 |
| 2011/0110282 | A1 | 5/2011 | Wu et al. | |
| 2011/0122780 | A1* | 5/2011 | Nieminen | H04W 52/0232 370/252 |
| 2014/0079016 | A1* | 3/2014 | Dai | H04L 5/0041 370/330 |

FOREIGN PATENT DOCUMENTS

| | | |
|---|---|---|
| JP | 2006518141 A | 8/2006 |
| JP | 2009523372 A | 6/2009 |
| KR | 1020060131049 A | 12/2006 |
| WO | 2007082235 A1 | 7/2007 |

OTHER PUBLICATIONS

IEEE Standard for Information Technology—Telecommunications and information exchange between systems—Local and metropolitan area networks—Specific requirements, Part 11: Wireless LAN Medium Access Control (MAC) and Physical Layer (PHY) specifications, Amendment 8: Medium Access Control (MAC) Quality of Service Enhancements, IEEE Computer Society, IEEE Std 802.11e-2005.

* cited by examiner

[Fig. 1]
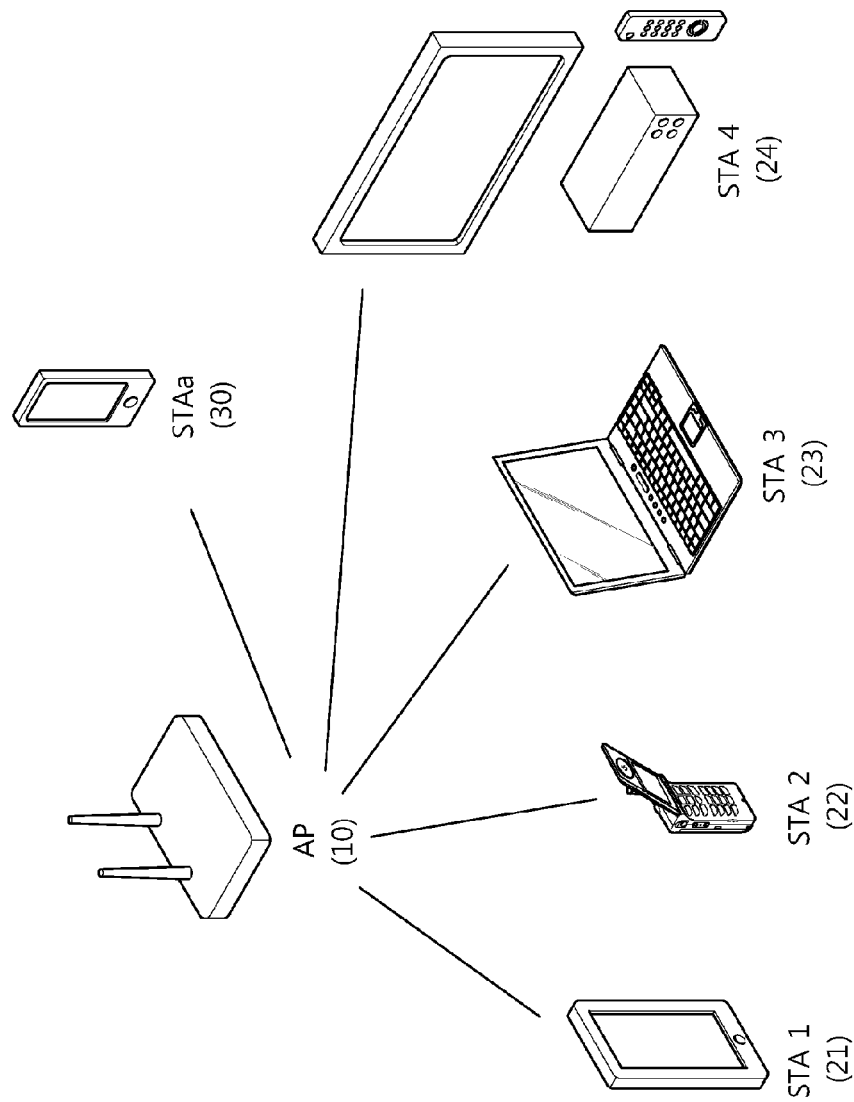
[Fig. 2]
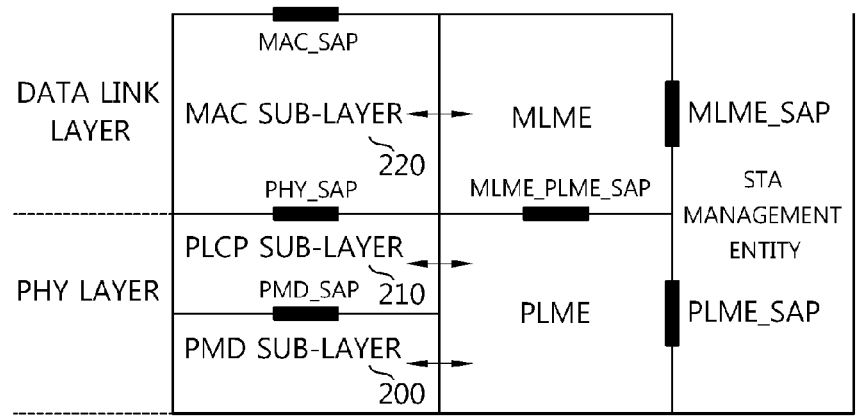

[Fig. 3]
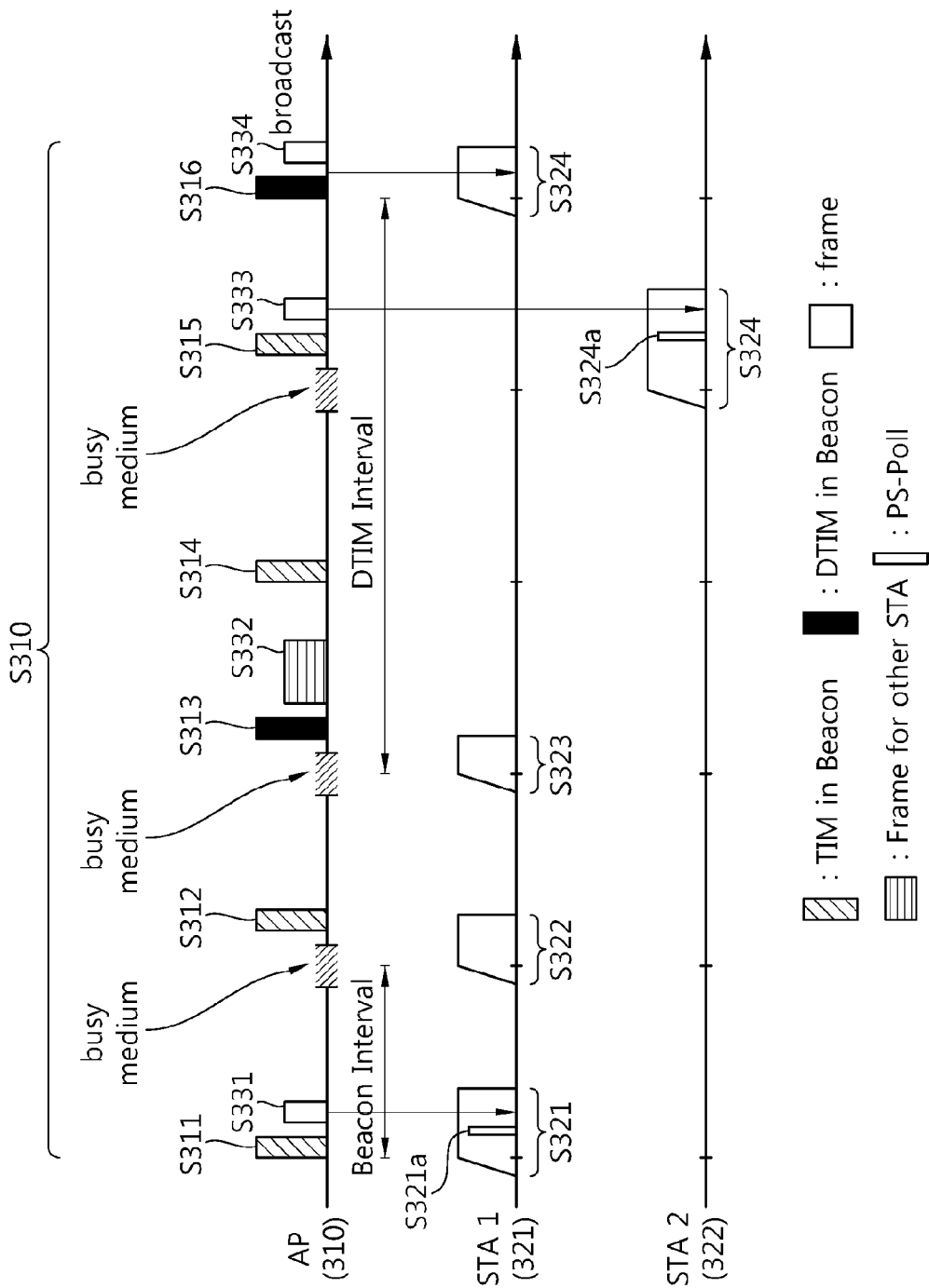

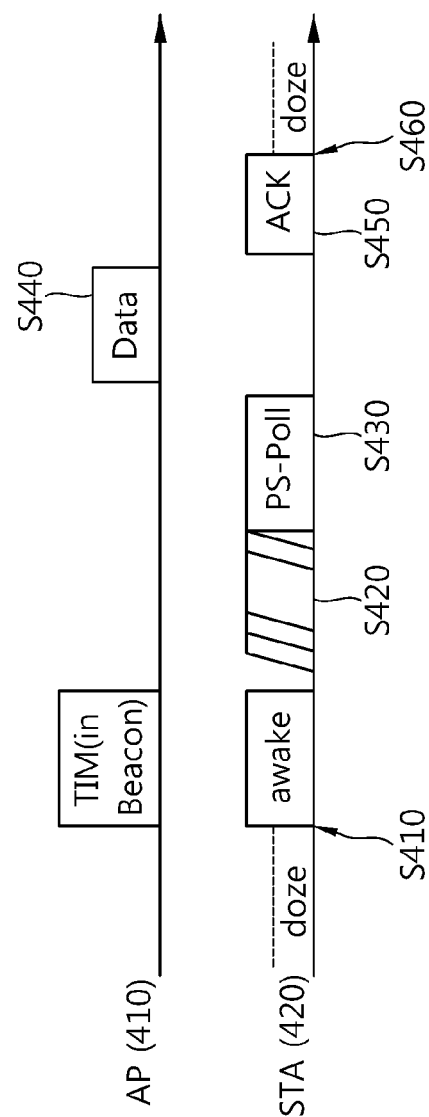
[Fig. 4]

[Fig. 5]
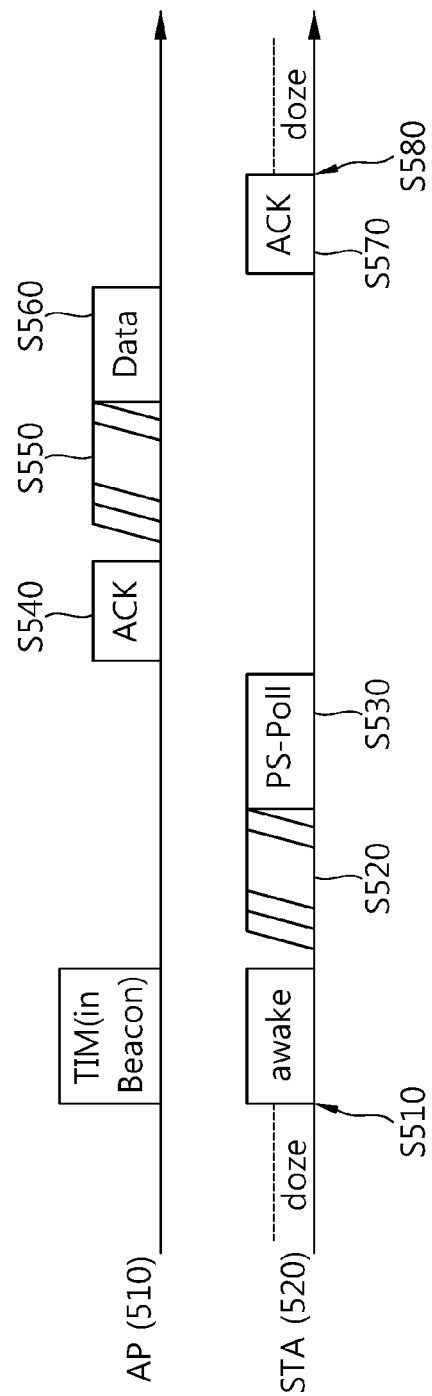

[Fig. 6]
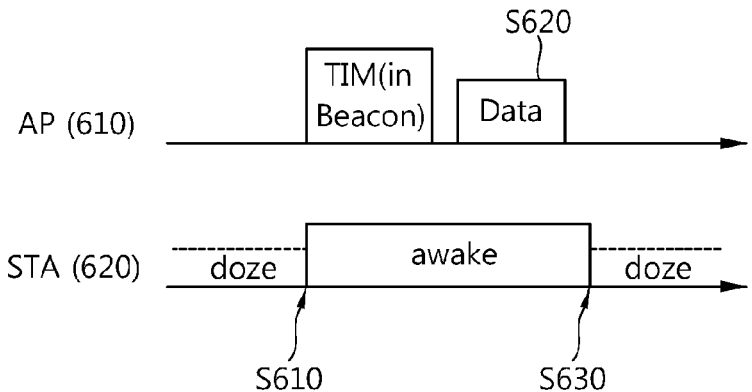
[Fig. 7]
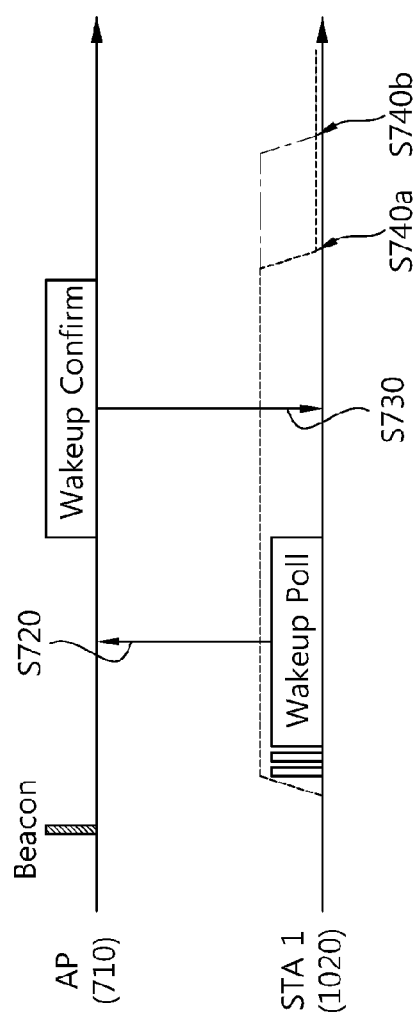

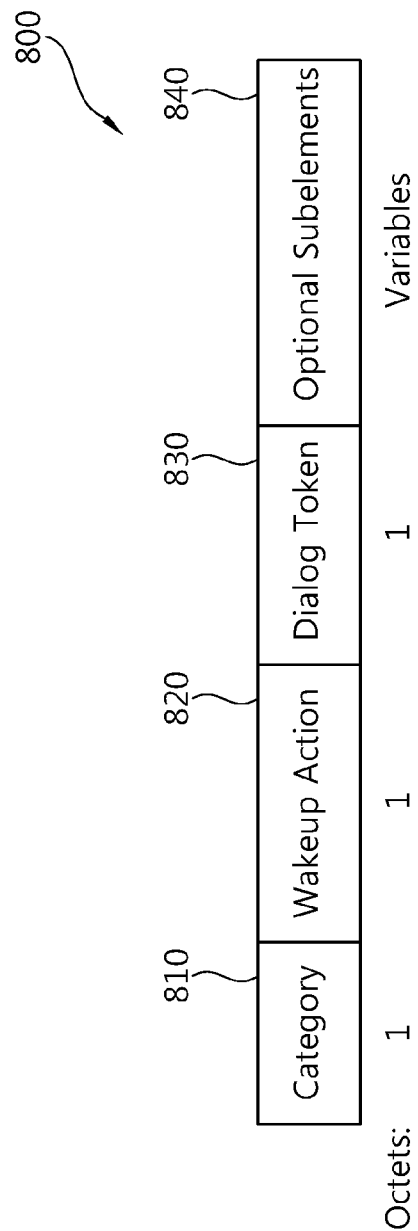
[Fig. 8]

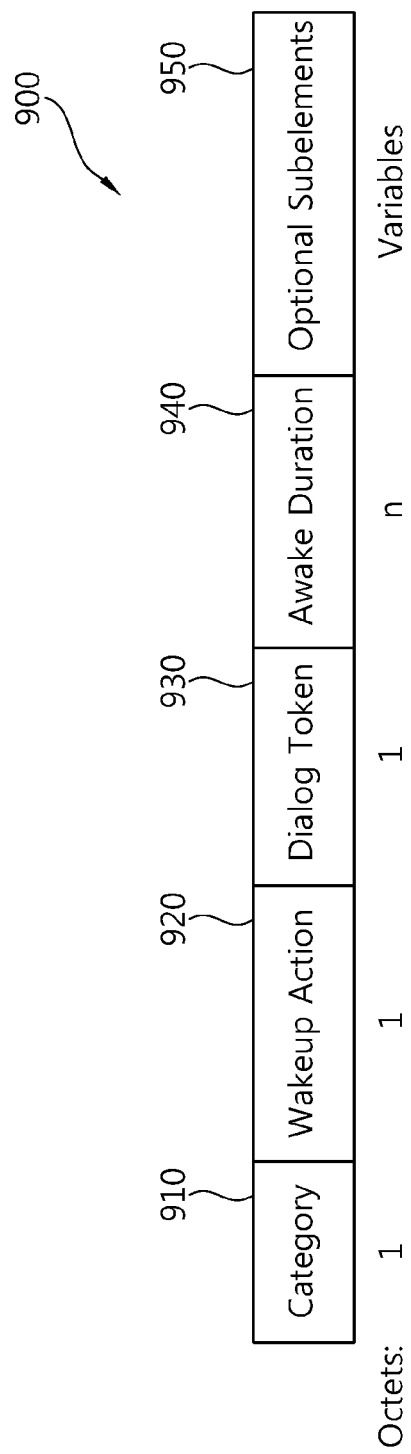
[Fig. 9]

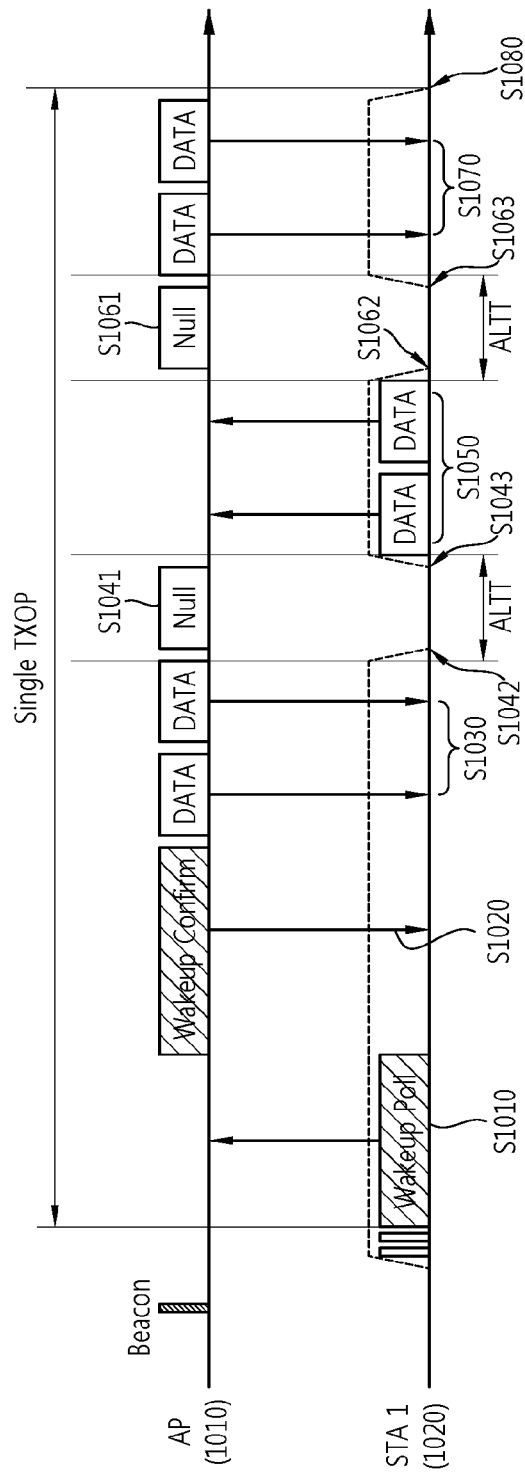
[Fig. 10]

[Fig. 11]
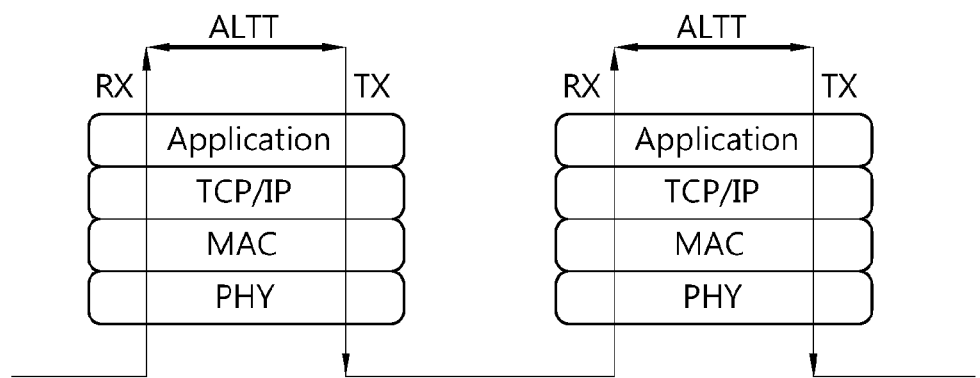
[Fig. 12]
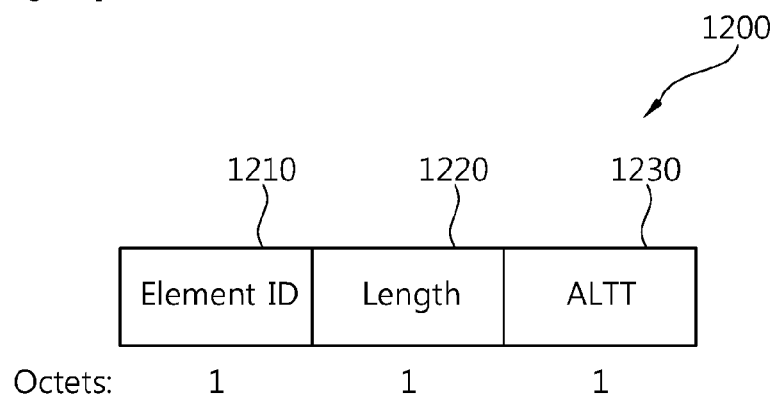

[Fig. 13]
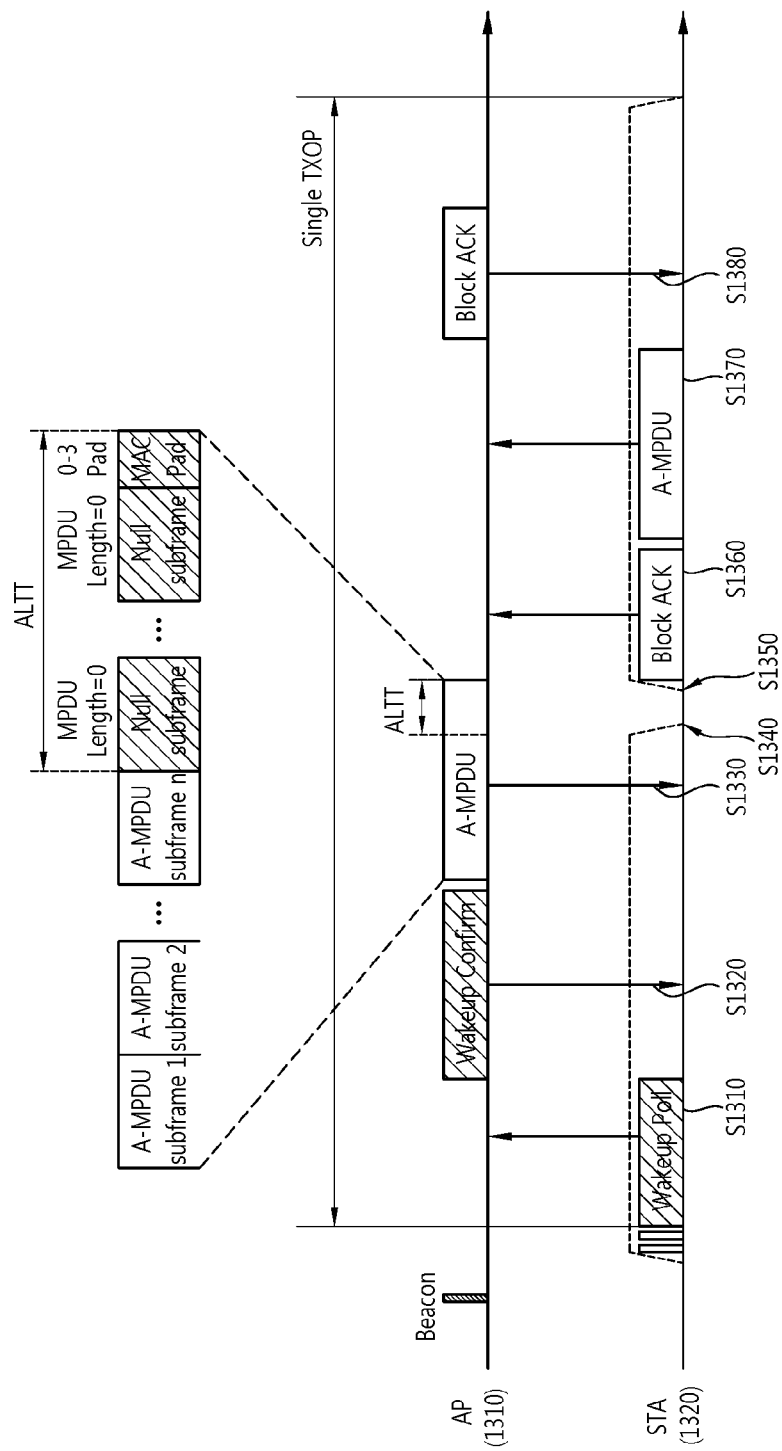

[Fig. 14]
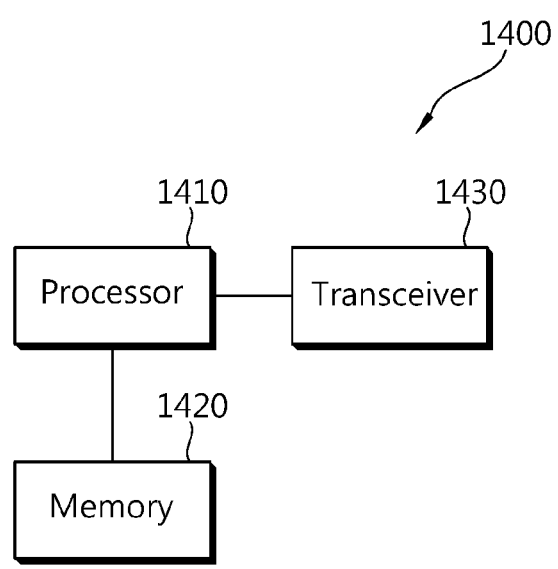

METHOD OF COMMUNICATION BASED ON POWER SAVE MODE IN WIRELESS LOCAL AREA NETWORK AND APPARATUS FOR THE SAME

This application is a 35 USC § 371 National Stage entry of International Application No. PCT/KR2012/001416, filed on Feb. 24, 2012, and claims priority to U.S. Provisional Application No. 61/508,018 filed Jul. 14, 2011, each of which is hereby incorporated by reference in its entirety.

TECHNICAL FIELD

The present invention relates to wireless communication and, more particularly, to a method of communication, performed by a station (STA), based on a power save mode in a wireless local area network (WLAN) system and an apparatus supporting the same.

BACKGROUND ART

With the advancement of information communication technologies, various wireless communication technologies have recently been developed. Among the wireless communication technologies, a wireless local area network (WLAN) is a technology whereby Internet access is possible in a wireless fashion in homes or businesses or in a region providing a specific service by using a portable terminal such as a personal digital assistant (PDA), a laptop computer, a portable multimedia player (PMP), etc.

The IEEE 802.11n is a technical standard relatively recently introduced to overcome a limited data rate which has been considered as a drawback in the WLAN. The IEEE 802.11n is devised to increase network speed and reliability and to extend an operational distance of a wireless network. More specifically, the IEEE 802.11n supports a high throughput (HT), i.e., a data processing rate of up to above 540 Mbps, and is based on a multiple input and multiple output (MIMO) technique which uses multiple antennas in both a transmitter and a receiver to minimize a transmission error and to optimize a data rate.

The WLAN system supports an active mode and a power save mode as an operation mode of a station (STA). The active mode implies an operation mode in which the STA operates in an awake state capable of transmitting and receiving a frame. On the other hand, the power save mode is supported for power saving of an STA which does not require the active state to receive the frame. An STA supporting the power save mode (PSM) can avoid unnecessary power consumption by operating in a doze mode when it is not a time duration in which the STA can access to its radio medium. That is, the STA operates in the awake state only for a time duration in which a frame can be transmitted to the STA or a time duration in which the STA can transmit the frame.

In a WLAN system, an access point (AP) manages traffic to be transmitted to stations (STAs) operating in a power save mode. When there is buffered traffic to be transmitted to a particular STA, a method for the AP to inform the corresponding STA about the buffered traffic and transmit a frame is required. Also, when the STA operates in a power save mode, an operation allowing the STA to normally receive the frame from the AP should be supported.

SUMMARY OF INVENTION

Technical Problem

The present invention provides a method of communication, performed by a station (STA), based on a power save mode in a wireless local area network (WLAN) system, and an apparatus supporting the same.

Solution to Problem

In an aspect, a communication method based on a power save mode, performed by a station (STA) in a wireless local area network (WLAN) system is provided. The method includes switching to an awake state; transmitting a wakeup poll frame to an access point (AP) the wakeup poll frame indicating that the station has switched to the awake state; receiving a wakeup confirm frame from the AP in response to the wakeup poll frame, the wakeup poll frame including an awake duration field, the awake duration field indicating an awake duration as a duration in which the station maintains the awake state; and switching to a doze state after the time interval indicated by the awake duration field has lapsed.

The method may further include receiving a data frame from the AP within the awake duration.

The method may further include switching to the doze state when a radio signal in relation to a null frame transmitted by the AP is detected after the data frame is received.

The method may further include switching to the awake state after an application layer turnaround time (ALTT) as a time required for the station to process reception data and transmission data, starting from a point in time at which the radio signal in relation to the null frame is detected to be received, has lapsed.

A length of the null frame may be determined by the ALTT.

The method may further include transmitting an ALTT element ID indicating the ALTT to the AP.

The ALTT element ID may be transmitted in an association request frame, the association request frame being transmitted by the station to request an association with the AP.

The ALTT element ID may be transmitted in a re-association request frame, the re-association request frame being transmitted by the station to request a re-association.

The data frame and the null frame may be transmitted in a single aggregate data unit.

The wakeup poll frame may further include a requesting listen interval field, the requesting listen interval indicating a listen interval requested to be applied to the station.

The wakeup confirm frame may further include a responding listen interval field, wherein the responding listen interval field indicates a listen interval to be applied to the station and the responding listen interval field is set based on setting of the requesting listen interval.

The method may further include periodically switching to the awake state according to the listen interval indicated by the responding listen interval field.

In another aspect, a wireless device is provided. The wireless device includes a transceiver configured to transmit and receive a radio signal and a processor operatively coupled with the transceiver. The processor is configured for: switching to an awake state; transmitting a wakeup poll frame to an access point (AP) the wakeup poll frame indicating that the station has switched to the awake state; receiving a wakeup confirm frame from the AP in response to the wakeup poll frame, the wakeup poll frame including an awake duration field, the awake duration field indicating an awake duration as a duration in which the station maintains the awake state; and switching to a doze state after the time interval indicated by the awake duration field has lapsed.

Advantageous Effects of Invention

According to embodiments of the present invention, an AP is able to control a power save mode operation of a station (STA). The AP can perform signaling during a period in which the STA operates in an awake state, and the STA performs the power save mode operation in response thereto. Accordingly, power of the STA can be managed by the AP.

In exchanging frames between the AP and/or the STA, an application layer turnaround time (ALTT) is considered, and power saving of the STA is supported during the ALTT interval. Thus, since unnecessary power consumption of the STA is prevented even when frames are exchanged during a single transmission opportunity (TXOP) interval, an effective power management can be supported.

A frame transmission and reception method based on the power save mode operation according to an embodiment of the present invention can further increase efficiency of a power management of the STA in a WLAN system supporting a machine-to-machine (M2M) for which a power management is of great importance.

BRIEF DESCRIPTION OF DRAWINGS

FIG. 1 is a diagram showing the configuration of a WLAN system to which embodiments of the present invention may be applied.

FIG. 2 shows a physical layer architecture of a WLAN system supported by IEEE 802.11.

FIG. 3 shows an example of a power management operation.

FIG. 4 shows an example of a response procedure of an AP in a TIM protocol.

FIG. 5 shows another example of a response procedure of an AP in a TIM protocol.

FIG. 6 shows a procedure of a TIM protocol based on a DTIM.

FIG. 7 is a view showing an operation of an STA operating in a power save mode according to an embodiment of the present invention.

FIG. 8 is a block diagram showing a format of a wakeup poll frame according to an embodiment of the present invention.

FIG. 9 is a block diagram showing a format of a wakeup confirm frame according to an embodiment of the present invention.

FIG. 10 is a view showing a procedure of exchanging data frames according to an embodiment of the present invention.

FIG. 11 is a view showing a transmission/reception process according to layers of the STA.

FIG. 12 is a block diagram showing a format of an ALTT information element according to an embodiment of the present invention.

FIG. 13 is a view showing an example of a procedure for exchanging data frames employing an embodiment of the present invention.

FIG. 14 is a schematic block diagram of a wireless device implementing an embodiment of the present invention.

MODE FOR THE INVENTION

FIG. 1 is a diagram showing the configuration of a WLAN system to which embodiments of the present invention may be applied.

Referring to FIG. 1, a WLAN system includes one or more Basic Service Set (BSSs). The BSS is a set of stations (STAs) which can communicate with each other through successful synchronization. The BSS is not a concept indicating a specific area An infrastructure BSS includes one or more non-AP STAs STA1, STA2, STA3, STA4, and STA5, an AP (Access Point) providing distribution service, and a Distribution System (DS) connecting a plurality of APs. In the infrastructure BSS, an AP manages the non-AP STAs of the BSS.

On the other hand, an Independent BSS (IBSS) is operated in an Ad-Hoc mode. The IBSS does not have a centralized management entity for performing a management function because it does not include an AP. That is, in the IBSS, non-AP STAs are managed in a distributed manner. In the IBSS, all STAs may be composed of mobile STAs. All the STAs form a self-contained network because they are not allowed to access the DS.

An STA is a certain functional medium, including Medium Access Control (MAC) and wireless-medium physical layer interface satisfying the Institute of Electrical and Electronics Engineers (IEEE) 802.11 standard. Hereinafter, the STA refers to both an AP and a non-AP STA.

A non-AP STA is an STA which is not an AP. The non-AP STA may also be referred to as a mobile terminal, a wireless device, a wireless transmit/receive unit (WTRU), a user equipment (UE), a mobile station (MS), a mobile subscriber unit, or simply a user. For convenience of explanation, the non-AP STA will be hereinafter referred to the STA.

The AP is a functional entity for providing connection to the DS through a wireless medium for an STA associated with the AP. Although communication between STAs in an infrastructure BSS including the AP is performed via the AP in principle, the STAs can perform direct communication when a direct link is set up. The AP may also be referred to as a central controller, a base station (BS), a node-B, a base transceiver system (BTS), a site controller, etc.

A plurality of infrastructure BSSs including the BSS shown in FIG. 1 can be interconnected by the use of the DS. An extended service set (ESS) is a plurality of BSSs connected by the use of the DS. APs and/or STAs included in the ESS can communicate with each another. In the same ESS, an STA can move from one BSS to another BSS while performing seamless communication.

In a WLAN system based on IEEE 802.11, a basic access mechanism of a medium access control (MAC) is a carrier sense multiple access with collision avoidance (CSMA/CA) mechanism. The CSMA/CA mechanism is also referred to as a distributed coordinate function (DCF) of the IEEE 802.11 MAC, and basically employs a "listen before talk" access mechanism. In this type of access mechanism, an AP and/or an STA senses a wireless channel or medium before starting transmission. As a result of sensing, if it is determined that the medium is in an idle status, frame transmission starts by using the medium. Otherwise, if it is sensed that the medium is in an occupied status, the AP and/or the STA does not start its transmission but sets and waits for a delay duration for medium access.

The CSMA/CA mechanism also includes virtual carrier sensing in addition to physical carrier sensing in which the AP and/or the STA directly senses the medium. The virtual carrier sensing is designed to compensate for a problem that can occur in medium access such as a hidden node problem. For the virtual carrier sending, the MAC of the WLAN system uses a network allocation vector (NAV). The NAV is a value transmitted by an AP and/or an STA, currently using the medium or having a right to use the medium, to anther AP or another STA to indicate a remaining time before the medium returns to an available state. Therefore, a value set to the NAV corresponds to a period reserved for the use of the medium by an AP and/or an STA transmitting a corresponding frame.

An IEEE 802.11 MAC protocol, together with a DCF, provides a Hybrid Coordination Function (HCF) based on a Point Coordination Function (PCF) in which a reception AP or a reception STA or both periodically poll a data frame using the DCF and a polling-based synchronous access scheme. The HCF includes Enhanced Distributed Channel Access (EDCA) in which a provider uses an access scheme for providing a data frame to a number of users as a contention-based scheme and HCF Controlled Channel Access (HCCA) employing a non-contention-based channel access scheme employing a polling mechanism. The HCF includes a medium access mechanism for improving the Quality of Service (QoS) of a WLAN and can transmit QoS data both in a Contention Period (CP) and a Contention-Free Period (CFP).

FIG. 2 shows a physical layer architecture of a WLAN system supported by IEEE 802.11.

The IEEE 802.11 PHY architecture includes a PHY layer management entity (PLME), a physical layer convergence procedure (PLCP) sub-layer 210, and a physical medium dependent (PMD) sub-layer 200. The PLME provides a PHY management function in cooperation with a MAC layer management entity (MLME). The PLCP sub-layer 210 located between a MAC sub-layer 220 and the PMD sub-layer 200 delivers to the PMD sub-layer 200 a MAC protocol data unit (MPDU) received from the MAC sub-layer 220 under the instruction of the MAC layer, or delivers to the MAC sub-layer 220 a frame received from the PMD sub-layer 200. The PMD sub-layer 200 is a lower layer of the PDCP sub-layer and serves to enable transmission and reception of a PHY entity between two STAs through a radio medium. The MPDU delivered by the MAC sub-layer 220 is referred to as a physical service data unit (PSDU) in the PLCP sub-layer 210. Although the MPDU is similar to the PSDU, when an aggregated MPDU (A-MPDU) in which a plurality of MPDUs are aggregated is delivered, individual MPDUs and PSDUs may be different from each other.

The PLCP sub-layer 210 attaches an additional field including information required by a PHY transceiver to the PSDU in a process of receiving the PSDU from the MAC sub-layer 220 and delivering it to the PMD sub-layer 200. The additional field attached to the PSDU in this case may be a PLCP preamble, a PLCP header, tail bits required to reset an convolution encoder to a zero state, etc. The PLCP sub-layer 210 receives a TXVECTOR parameter delivered from the MAC sub-layer. The TXVECTOR parameter includes control information required to generate and transmit a PLCP protocol data unit (PPDU) and control information required by the reception STA to receive and interpret the PPDU. The PLCP sub-layer 210 uses information included in the TXVECTOR parameter when generating the PPDU including the PSDU.

The PLCP preamble serves to allow a receiver to prepare a synchronization function and antenna diversity before the PSDU is transmitted. The data field may include a coded bit sequence obtained by encoding a bit sequence including a PSDU to which padding bits, a service field including bit sequence for initializing a scrambler and tail bits are attached. In this case, either binary convolutional coding (BCC) encoding or low density parity check (LDPC) encoding can be selected as an encoding scheme according to an encoding scheme supported in an STA that receives the PPDU. The PLCP header may include control information required for a recipient to obtain data included in a PLCP protocol data unit (PPDU).

The PLCP sub-layer 210 generates a PPDU by attaching the aforementioned field to the PSDU and transmits the generated PPDU to a reception STA via the PMD sub-layer. The reception STA receives the PPDU, acquires information required for data recovery from the PLCP preamble and the PLCP header, and recovers the data. The PLCP sub-layer of the reception STA delivers an RXVECTOR parameter including control information included in a PLCP preamble and a PLCP header to the MAC sub-layer so that the PPDU can be interpreted and data can be acquired in a reception state.

The WLAN system supports a transmission channel of more continuous 160 MHz and non-continuous 80+80 MHz bands to support a higher throughput. In addition, the WLAN system supports a multi user-multiple input multiple output (MU-MIMO) transmission scheme. An AP and/or an STA which intends to transmit data in the WLAN system supporting the MU-MIMO transmission scheme can transmit data packets simultaneously to at least one or more reception STAs which are MU-MIMO paired.

Referring back to FIG. 1, in the WLAN system as shown in the drawing, the AP 10 can simultaneously transmit data to an STA group including at least one STA among a plurality of STAs 21, 22, 23, 24, and 30 associated with the AP 10. Although it is shown in FIG. 1 that the AP performs MU-MIMO transmission to the STAs, in a WLAN system supporting a tunneled direct link setup (TDLS) or direct link setup (DLS) and a mesh network, an STA which intends to transmit data can transmit a PPDU to the plurality of STAs by using the MU-MIMO transmission scheme. Hereinafter, a case where the AP transmits the PPDU to the plurality of STAs according to the MU-MIMO transmission scheme will be described for example.

Data to be transmitted to each STA can be transmitted through a different spatial stream. A data packet to be transmitted by the AP 10 is a PPDU generated and transmitted in a physical layer of the WLAN system or a data field included in a PPDU, and can be referred to as a frame. That is, the data field included in the PPDU for SU-MIMO and/or MU-MIMO can be called a MIMO packet. It is assumed in the embodiment of the present invention that the STA1 21, the STA2 22, the STA3 23, and the STA4 24 belong to a transmission target STA group which is MU-MIMO paired with the AP 10. In this case, data may not be transmitted to a specific STA of the transmission target STA group since a spatial stream is not allocated thereto. Meanwhile, although the STAa 30 is associated with the AP, it is assumed that the STAa 30 is an STA not included in the transmission target STA group.

An identifier can be allocated to a transmission target STA group in order to support MU-MIMO transmission in the WLAN system, and such an identifier is called a group identifier (ID). The AP transmits a group ID management frame including group definition information for group ID allocation to STAs supporting MU-MIMO transmission. Accordingly, the group ID is allocated to STAs before PPDU transmission. A plurality of group IDs may be allocated to one STA.

Table 1 below shows an information element included in the group ID management frame.

TABLE 1

| order | information |
|---|---|
| 1 | category |
| 2 | VHT action |
| 3 | membership status |
| 4 | spatial stream position |

In the category field and the VHT action field, a frame corresponds to a management frame, and is configured to be able to identify a group ID management frame used in a next generation WLAN system supporting MU-MIMO.

As shown in Table 1, the group definition information includes membership status information indicating whether it belongs to a specific group ID, and if it belongs to the specific group ID, includes spatial stream location information indicating at which position a spatial stream set of a corresponding STA is located among all spatial streams based on MU-MIMO transmission.

Since one AP manages a plurality of group IDs, the membership status information provided to one STA needs to indicate whether an STA belongs to each group ID managed by the AP. Therefore, the membership status information can exist in an array format of sub-fields indicating whether it belongs to each group ID. Since the spatial stream location information indicates a location of a spatial stream set for each group ID, it can exist in an array format of sub-fields indicating a location of a spatial stream set occupied by an STA for each group ID. In addition, spatial stream information and membership status information for one group ID can be implemented in one sub-field.

When the AP transmits a PPDU to a plurality of STAs by using a MU-MIMO transmission scheme, the AP transmits the PPDU by inserting information indicating a group ID into the PPDU as control information. When the STA receives the PPDU, the STA confirms the group ID field and thus confirms whether the STA is a member STA of a transmission target STA group. If it is confirmed that the STA is the member of the transmission target STA group, the STA can determine at which position a spatial stream set to be transmitted to the STA is located among all spatial streams. Since the PPDU includes information indicating the number of spatial streams allocated to a reception STA, the STA can receive data by searching for spatial streams allocated to the STA.

Meanwhile, if channel sensing is always performed for frame transmission and reception, it causes persistent power consumption of the STA. Since power consumption in a reception state is not much different from power consumption in a transmission state, if the reception state needs to be continuously maintained, relatively great power consumption is generated in an STA that operates by using a battery. Therefore, when the STA senses a channel by persistently maintaining a reception standby state in a WLAN system, ineffective power consumption may be caused without a special synergy effect in terms of a WLAN throughput, and thus it may be inappropriate in terms of power management.

To compensate for the problem above, the WLAN system supports a power management (PM) mode of the STA. A power management (PM) mode of a STA is classified into an active mode and a power save (PS) mode in a WLAN system. Basically, the STA operates in the active mode. When operating in the active mode, the STA can operate in an awake state so that a frame can be received all the time.

When operating in the PS mode, the STA operates by transitioning between a doze state and the awake state. When operating in the doze state, the STA operates with minimum power, and does not receive a radio signal, including a data frame, transmitted from an AP. In addition, the STA operating in the doze state does not perform channel sensing.

The longer the STA operates in a doze state, the less the power consumption is, and thus the longer the STA operates. However, since a frame cannot be transmitted and received in the doze state, the STA cannot operate long unconditionally. If the STA operating in the doze state has a frame to be transmitted to the AP, the STA can transition to an awake state to transmit the frame. However, if the AP has a frame to be transmitted to the STA operating in the doze state, the STA cannot receive the frame and cannot know that there is the frame to be received. Therefore, the STA may need to know whether there is the frame to be transmitted to the STA, and if the frame exists, may require an operation for transitioning to the awake state in accordance with a specific period. According to this operation, the AP can transmit the frame to the STA. This will be described with reference to FIG. 3.

FIG. 3 shows an example of a power management operation.

Referring to FIG. 3, an AP 310 transmits a beacon frame to STAs in a BSS in accordance with a specific period (step S310). The beacon frame includes a traffic indication map (TIM) information element. The TIM element includes information for reporting that the AP 310 has buffered traffic for which the STAs associated with and a frame will be transmitted. Examples of the TIM element include a TIM used to report a unicast frame and a delivery traffic indication map (DTIM) used to report a multicast or broadcast frame.

The AP 310 transmits the DTIM one time whenever a beacon frame is transmitted three times.

An STA1 321 and an STA2 322 are STAs operating in a PS mode. The STA1 321 and the STA2 322 can be configured such that they can transition from a doze state to an awake state in every wakeup interval of a specific period to receive the TIM element transmitted by the AP 310.

A specific wakeup interval can be configured such that the STA1 321 transitions to the awake state in every beacon interval to receive the TIM element. Therefore, the STA1 321 transitions to the awake state (step S321) when the AP 310 transmits a first beacon frame (step S311). The STA1 321 receives the beacon frame and acquires the TIM element. If the acquired TIM element indicates that there is a frame to be transmitted to the STA1 321, then the STA1 321 transmits to the AP 310 a PS poll frame that requests the AP 310 to transmit a frame (step S321a). The AP 310 transmits the frame to the STA1 221 in response to the PS poll frame (step S331). Upon completion of frame reception, the STA1 321 operates by transitioning back to the doze state.

When the AP 310 transmits a second beacon frame, a medium is busy, that is, another device accesses to the medium for example. Thus, the AP 310 may not be able to transmit the beacon frame in accordance with a correct beacon interval but may transmit it at a delayed time point (step S312). In this case, the STA1 321 switches its mode to the wake state in accordance with the beacon interval, but cannot receive the beacon frame transmitted with delay, and thus transitions back to the doze state (step S322).

When the AP 310 transmits a third beacon frame, the beacon frame may include a TIM element which is configured as a DTIM. However, since the medium is busy, the AP 310 transmits the beacon frame with delay (step S313). The STA1 321 operates by transitioning to the awake state in accordance with the beacon interval, and can acquire the DTIM by using the beacon frame transmitted by the AP 310. The DTIM acquired by the STA1 321 indicates that there is no frame to be transmitted to the STA1 321 and there is a frame for another STA. Therefore, the STA1 321 operates by transitioning back to the doze state. After transmitting the beacon frame, the AP 310 transmits the frame to a corresponding STA (step S332).

The AP 310 transmits a fourth beacon frame (step S314). However, since the STA1 321 cannot acquire information indicating that there is buffered traffic for the STA1 321 by receiving the TIM element two times, the STA1 321 may regulate a wakeup interval for receiving the TIM element. Alternatively, if signaling information for regulating a wakeup interval value of the STA1 321 is included in the beacon frame transmitted by the AP 310, the wakeup interval value of the STA1 321 may be regulated. Instead of transitioning an operation state for every beacon interval to receive the TIM element, the STA1 321 can be configured in the present embodiment such that the operation state is transitioned one time for every three beacon intervals. Therefore, the STA1 321 cannot acquire a corresponding TIM element since the AP 310 transmits the fourth beacon frame (step S314), and maintains the doze state when a fifth beacon frame is transmitted (step S315).

When the AP 310 transmits a sixth beacon frame (step S316), the STA1 321 operates by transitioning to the awake state, and acquires the TIM element included in the beacon frame (step S324). The TIM element is a DTIM that indicates existence of a broadcast frame, and thus the STA1 321 receives the broadcast frame transmitted by the AP 310 (step S334) instead of transmitting a PS poll frame to the AP 310.

Meanwhile, the wakeup interval assigned to the STA2 322 may have a longer period than that of the STA1 321. Therefore, the STA2 322 can receive the TIM element by transitioning to the awake state (step S325) when the fifth beacon frame is transmitted (step S315). The STA2 322 knows existence of a frame to be transmitted to the STA2 322 by using the TIM element, and transmits a PS poll frame to the AP 310 to request transmission (step S325a). The AP 310 transmits a frame to the STA2 322 in response to the PS poll frame (step S333).

In order to operate the PS mode of FIG. 3, the TIM element includes a TIM that indicates whether there is a frame to be transmitted to the STA or a DTIM that indicates whether there is a broadcast/multicast frame. The DTIM may be implemented by configuring a field of the TIM element.

A detailed response procedure of the STA that receives the TIM element can be described below with reference to FIG. 4 to FIG. 6.

FIG. 4 shows an example of a response procedure of an AP in a TIM protocol.

Referring to FIG. 4, an STA 420 switches its operation state from a doze state to an awake state to receive a beacon frame including a TIM from an AP 410 (step S410). The STA 420 interprets a received TIM element and thus can know whether there is buffered traffic to be delivered to the STA 420.

The STA 420 contends with other STAs to access to a medium for transmitting a PS poll frame (step S420), and transmits the PS poll frame to request the AP 410 to transmit a data frame (step S430).

Upon receiving the PS poll frame transmitted by the STA 420, the AP 410 transmits a data frame to the STA 420. The STA2 420 receives the data frame, and transmits an acknowledgment (ACK) frame to the AP 410 in response thereto (step S450). Thereafter, the STA2 420 switches its operation mode back to the doze state (step S460).

Instead of immediate response of FIG. 4 in which the data frame is transmitted immediately after receiving the PS poll frame from the STA, the AP may transmit data at a specific time point after receiving the PS poll frame.

FIG. 5 shows another example of a response procedure of an AP in a TIM protocol.

Referring to FIG. 5, an STA 520 switches its operation state from a doze state to an awake state to receive a beacon frame including a TIM from an AP 510 (step S510). The STA 520 interprets a received TIM element and thus can know whether there is buffered traffic to be delivered to the STA 520.

The STA 520 contends with other STAs to access to a medium for transmitting a PS poll frame (step S520), and transmits the PS poll frame to request the AP 510 to transmit a data frame (step S530).

If the AP 510 receives the PS poll frame but fails to prepare for a data frame during a specific time interval such as a short inter-frame space (SIFS), instead of directly transmitting the data frame, the AP 410 transmits an ACK frame to the STA 520 (step S540). This is a characteristic of a deferred response which is different from step S440 of FIG. 4 in which the AP 410 directly transmits the data frame to the STA 420 in response to the PS poll frame.

The AP 510 performs contending when the data frame is prepared after transmitting the ACK frame (step S550), and transmits the data frame to the STA 520 (step S560).

The STA 520 transmits an ACK frame to the AP 510 in response to the data frame (step S570), and switches its operation mode to the doze state (step S580).

When the AP transmits a DTIM to the STA, a subsequent procedure of a TIM protocol may differ.

FIG. 6 shows a procedure of a TIM protocol based on a DTIM.

Referring to FIG. 6, an STA 620 switches its operation state from a doze state to an awake state to receive a beacon frame including a TIM from an AP 610 (step S610). The STAs 620 can know that a multicast/broadcast frame will be transmitted by using the received DTIM.

After transmitting a beacon frame including the DTIM, the AP 620 transmits the multicast/broadcast frame (step S620). After receiving the multicast/broadcast frame transmitted by the AP 610, the STAs 620 switch the operation state back to the doze state (step S630).

In the power save mode operation method based on the TIM protocol described with reference to FIG. 3 to FIG. 6, STAs can determine whether there is a data frame to be transmitted for buffered traffic by using STA identifying information included in the TIM element. The STA identifying information may be information related to an association identifier (AID) as an identifier assigned when the STA is associated with an AP. The STA identifying information may be configured to directly indicate AIDs of STAs having buffered traffic or may be configured in a bitmap type in which a bit order corresponding to an AID value is set to a specific value. The STAs can know that there is buffered traffic for them if the STA identifying information indicates their AIDs.

The AID is uniquely used in a single BSS and, currently, it may have values of 1 to 2007. In order to indicate the AID, 14 bits are allocated to support a maximum of 16383, but AID having values of 2008 to 16383 are reserved.

Meanwhile, recently, as various communication services such as smart grid, e-health, ubiquitous, and the like, have emerged, an M2M technology supporting the services has come to prominence. A sensor sensing a temperature, moisture, or the like, a camera, a home appliance such as a TV, or the like, a processing machine in a plant, and even a large-scale machine such as an automobile, or the like, may be a single element constituting an M2M system. The elements constituting the M2M system may transmit and receive data based on WLAN communication. Hereinafter, establishment of a network by devices constituting an M2M system, while supporting WLAN, will be referred to as an M2M WLAN system.

The characteristics of the WLAN system supporting M2M are as follows.

1) Large number of stations (STA): Unlike an existing network, M2M is premised on that a large number of STAs exist within a BSS. This is because, sensors installed at home, in the office, and the like, as well as a device held by an individual, are all taken into consideration. Thus, a great number of STAs may be connected to a single AP.

2) Low traffic load per STA: An M2M terminal has a traffic pattern of collecting peripheral information and reporting the same, so it does not need to frequently send the information and the amount of the information is small.

3) Uplink-centered communication: M2M largely has a structure in which a command is received from downlink, an action is taken, and then, result data is reported to uplink. Major data is generally transmitted to uplink, so the uplink is centered in a system supporting M2M.

4) Power management of STA: An M2M terminal is mainly operated by a battery, and it happens, in many cases, that it is difficult for the user to frequently charge the M2M terminal. Thus, a power management method for minimizing battery consumption is required.

5) Automatic recovery function: It is difficult for a user to directly manipulate a device constituting the M2M system in a particular situation, so an auto-recovery function is required.

Hereinafter, in order to described an embodiment of the present invention in detail, a WLAN system supporting M2M having the foregoing features will be describe as an example, However, the scope of the present invention not limited to the WLAN system supporting M2M and may be applied to general wireless communication including a general WLAN system.

In a server/client structure of a general WLAN system, in general, a client such as an STA requests information from a server, and the server transmits information (data) to the STA in response. Here, the server providing information may be considered to be a machine which mechanically collects and provides information, and the subject receiving information may be a user who uses the client. According to these structural characteristics, a downlink communication technology has been mainly developed in the existing WLAN system.

Meanwhile, in the WLAN system supporting M2M, such a structure is changed. Namely, a client, as a device, serves to collect and provide information, and a user who manages a server has a position of requesting information. Namely, the M2M-supported WLAN system generally has a communication flow that an M2M server issues a command in relation to measurement of a surrounding environment to M2M STAs and the M2M STAs perform an operation according to the command and report collected information to the server. Unlike the conventional cases, the structural characteristics of the M2M-supported WLAN system lie in that the user accesses a network from a server and communication flows in the opposite direction.

Due to such structural characteristics, in order to perform effective M2M communication, it is required to reduce the function of the existing STA and increase the management function in a network. In an existing network model, since the user is at the STA's side, a network management function is also given to the STA. However, in the M2M-supproted WLAN system, since an STA simply only needs to perform an operation according to a command and report collected information, the network management function of the server is required to be reinforced.

In the existing WLAN system, an STA is a terminal a user directly uses or controls. Thus, the option of the terminal is guaranteed and the terminal is operated according to a situation or according to a user selection. In particular, in terms of power consumption and power saving, the user as a subject controls an STA, so the terminal may be maintained in an idle state for a long period of time or a battery thereof may be charged at a desired time and used. Namely, the function desired by the STA may be executed according to a user's intention. Also, although the terminal is maintained in an idle state for a long period of time, it does not may make any problem in the network aspect, and it may be considered that the operation of an individual terminal is defined according to a user's option who uses or controls the corresponding terminal.

In comparison, in the M2M-supported WLAN system, an STA is a machine which collects and provides information, so it is required to be controlled by a network such as a previously designated AP, or the like. However, according to a protocol defined in the existing WLAN system, a power save mode operation that the STA independently changes an awake state and a doze state so as to operate is supported. This may cause a problem such that exchanging of frames including information or data is impossible because STAs are operated in a doze state at a time when the user who manages the AP requires it, or the STAs are operated in an awake state at an unnecessary timing to consume a battery, or the like. Thus, in an embodiment of the present invention, a method of enabling the AP to control when, how, and how many times STAs are to change the awake state and doze state to operate is required. In addition, a communication method between an AP and/or STAs based on a power save mode controlled by the AP is also required.

The present invention proposes a method of information an AP about a change of a state when an STA is changed into an awake state. This will now be described with reference to the accompanying drawings.

FIG. 7 is a view showing an operation of an STA operating in a power save mode according to an embodiment of the present invention.

With reference to FIG. 7, an STA 720 operating in a doze state switches to an awake state (S710). A timing at which the STA 720 switches to the awake state may be a predetermined particular timing or a certain timing.

The STA 710 switching to the awake state transmits a wakeup poll frame to an AP 710 (S720). The wakeup poll frame is transmitted in order to inform the AP 710 that the STA 720 has switched to an awake state and request an instruction of the AP 710 as to whether or not the STA 720 is to be maintained in the awake state or switch to the doze state again. In addition, the wakeup poll frame may include information related to a power save mode operation requested by the STA 720 or the AP 710, so it may be implemented to request an acceptance as to whether or not the AP 710 approves it.

FIG. 8 is a block diagram showing a format of a wakeup poll frame according to an embodiment of the present invention. The wakeup poll frame may be an action management frame.

With reference to FIG. 8, the wakeup poll frame 800 may include a category field 810, a wakeup action field 820, and a dialog token field 830. In addition, the wakeup poll frame 800 may further include an operational subelement 840 for information related to a power save mode operation.

The category field 810 and the wakeup action field 820 may be set to indicate that a corresponding frame is the wakeup poll frame 800.

The dialog token field 830 may be set to be a value for identifying a poll/confirm transaction, and the dialog token field 830 may be set to be any other value than 0 by the STA 820.

The wakeup poll frame 800 is used for informing the AP 719 that the STA 720 switches to the awake state. This frame may be transmitted with the optional subelement 840 omitted.

The optional subelement 840 may include information related to a power save mode operation. The optional subelement 840 may include a requesting listen interval field. The requesting listen interval field may be set to indicate a listen interval requested to be changed by the STA 720. The listen interval may refer to a doze/awake state change period of the STA 720, and may be set in units of a beacon interval.

For example, in case of the M2M STA, when it is determined that there is no problem when a time during which the M2M STA operates in a doze state statistically because a change in periodically sensed data values is low, the STA may request changing of the listen interval in order to reduce power consumption. To this end, the requesting listen interval field may be included in the wakeup poll frame 800 and transmitted. Here, since the value set in the requesting listen interval field is a value requested by the STA 720 to the AP 710, an acknowledgement of the AP 710 thereto may be requested.

With reference back to FIG. 7, the AP 710 transmits a wakeup confirm frame to the STA 720 in response to the wakeup poll frame (S730). The AP 710 may control the operation of the STA 720 which is operated in the power save mode and has been changed into the awake state by transmitting the wakeup confirm frame. Also, the AP 710 may confirm/respond to information in relation to the power save mode operation requested by the STA 720.

FIG. 9 is a block diagram showing a format of a wakeup confirm frame according to an embodiment of the present invention. The wakeup confirm frame may be an action management frame.

With reference to FIG. 9, the wakeup confirm frame 900 may include a category field 910, a wakeup action field 920, a dialog token field 930, and an awake duration field 940. In addition, the wakeup confirm frame 900 may further include an operational subelement 950 in relation to a response to the optional subelement 840 of the wakeup poll frame 800.

The category field 910 and the wakeup action field 920 may be set to indicate that a corresponding frame is the wakeup confirm frame 900.

The dialog token field 930 may be set to be a value identifying a poll/confirm transaction. The dialog token field 930 may be set to be equal to a value set in the dialog token field 830 of the wakeup poll frame 800.

The awake duration field 940 may be set to indicate a duration in which the STA 720 is maintained in the awake state starting from a point in time at which the awake confirm frame 900. An n value of a field size of an octet unit may be determined according to how precisely the duration is informed. The unit of time may be a predetermined time unit (TU), or in another example, it may be a microsecond unit or defined in the form of a multiple by using a slot as a basic unit.

A responding listen interval field may be included as the optional subelement 950 in response to the listen interval requested by the STA 720. The responding listen interval field may be set to be a value of the listen interval field requested by the STA 710 or may be set to be a different listen interval value set for the STA 720 by the AP 710. The STA 720 should operate according to the responding listen interval field value within the wakeup confirm frame 900 responded by the AP 710, regardless of the value of the requesting listen interval field of the wakeup poll frame 800. The AP 710 may determine and set the value of the responding listen interval field based on the listen interval requested by the STA 720.

With reference back to FIG. 7, the STA 720 operates the power save mode according to the value of the awake duration field 920 included in the wakeup confirm frame 900. When the value of the awake duration field 940 is set to be 0, the STA 720 switches to the listen state immediately after receiving the wakeup confirm frame 900 (S740a). When the awake duration field 940 is set to be 0, it means that there is no buffered traffic for the STA 720.

When the value of the awake duration field 940 is set to be any other value than 0, the STA 720 receives the wakeup confirm frame 900, maintains an awake state during a time indicated by the value of the awake duration field 940, and then, is changed into the doze state (S740b).

When the wakeup confirm frame transmitted by the AP 710 is a response to the wakeup poll frame transmitted by the STA 720 immediately beforehand, the transmission of the wakeup confirm frame 900 may be regarded as a transmission of an acknowledgement (ACK) frame with respect to the wakeup poll frame in the position of the STA 710. Namely, when the STA 720 receives the wakeup confirm frame 900, the STA 720 may not need to transmit an ACK frame in response thereto. When the STA 720 fails to receive the wakeup confirm frame in response to the wakeup poll frame, it may consider that ACK has not been received, and may transmit the wakeup poll frame again to the AP.

FIG. 10 is a view showing a procedure of exchanging data frames according to an embodiment of the present invention. It is assumed that procedure of exchanging frames in FIG. 10 is performed within a single transmission opportunity (TXOP).

With reference to FIG. 10, the STA 1020, which has been changed into an awake state, transmits a wakeup poll frame to an AP 1010 (S1010).

The AP 1010 transmits a wakeup confirm frame 900 to the STA 1010 in response to the wake poll frame (S1020). The AP 1010 may indicate that there is buffered traffic for the STA 1020 through the awake duration field set to be other value than 0 of the wakeup confirm frame.

There may be a case in which only the AP 1010 transmits data frame(s) with respect to the buffered traffic, the TXOP is not terminated, and thereafter, the STA 1020 is expected to transmit data frame(s), or the like. Namely, there may be a case in which exchanging of data frames between the AP 1010 and the STA 1020 at least one or more times is expected. To this end, the AP 1010 may set the awake duration field to have a sufficient large value such that the procedure of exchanging data frames is entirely terminated. Through setting of the awake duration field, the STA 1020 may maintain an awake state intended by the AP 1010. In this embodiment, it is assumed that the awake duration field is set to indicate up to a timing at which the TXOP is terminated.

The AP 1010 transmits a data frame to the STA 1020 (S1030). Here, the AP 1010 may transmit one or more data frames to the STA 1020. Although not shown, in response to the data frames transmitted by the AP 1010, the STA 1020 may transmit an ACK frame to the AP 1010. The STA 1020 may transmit the ACK frame for every data frame transmitted by the AP 1010. Or, after receiving data frames transmitted from the AP 1010, the STA 1020 may transmit a block ACK frame to acknowledge the entire received data frames. The ACK frame transmission and reception may be applied to exchanging of data frames hereinafter, and a description thereof will be omitted.

The present proposes a scheme in which the AP 1010 transmits a frame such as a QoS Null frame (referred to as a 'Null frame', hereinafter) within the single TXOP interval to provide/guarantee an application layer turnaround time (ALTT) for a transmission of data frame(s) continued for the STA. ALTT will be described with reference to FIG. 11.

FIG. 11 is a view showing a transmission/reception process according to layers of the STA.

When the STA 1020 receives the data frame(s) for the buffered traffic from the AP 1010, processing is performed in the STA itself until when a data stream included in the frames reaches an application layer through a PHY layer, a MAC layer, and a TCP/IP layer. Thus, a reception data processing time may be required for the STA 1020 to process the data frame(s) after receiving them. Also, when the STA wants to transmit data frame(s) after completing the processing of the received data frames in response, a transmission data processing time may be required to transmit the data frame(s) to an actual wireless medium through the application layer, the TCP/IP layer, the MAC layer, and the PHY layer in reverse. The data processing time of the STA 1020 itself including the reception data processing time and the transmission data processing time may be referred to as the ALTT.

With reference back to FIG. 10, the AP 1010 transmits the Null frame to the STA 1020 in order to prevent an occurrence of a situation in which a different STA occupies the channel during the ALTT interval (S1041). TXOP can be maintained through the transmission of the Null frame. A length of the Null frame may be determined based on a time length of the ALTT. Specifically, the length of the Null frame may be determined appropriately according to the length of the ALTT.

Upon receiving the Null frame, the STA 1020 may turn off the termination of the network card during the ALTT interval and may be changed into a doze mode in which an operation such as processing only internal data, or the like, is performed (S1042). Through this, the STA 1020 may wave power by itself during the ALTT interval.

After the ALTT interval is terminated, the STA 1020 may be changed into the awake state (S1043) and transmit data frame(s) to the AP 1010 (S1050).

After receiving the data frame(s) from the STA 1020, the AP 1010 may transmit a Null frame for ALTT to the STA 1020 (S1061).

Upon receiving the Null frame from the AP 1010, the STA 1020 is changed into a doze state (S1062) and when the ALTT is terminated, the STA 1020 may be changed into an awake state (S1063).

After the ALTT interval is terminated, the AP 1010 may transmit data frame(s) to the STA 1020 during the remaining TXOP interval (S1070), and exchanging of data frames between the AP 1010 and/or the STA 1020 may be additionally performed within the TXOP interval (not shown).

At a timing when the TXOP interval is terminated, the STA 1020 may be changed into a dose state (S1080).

When there is no more data frame to be exchanged between the AP 1010 and the STA 1020 within the TXOP interval, the AP transmits the wakeup confirm frame 900 as shown in FIG. 9 to the STA 1020, and in this case, the AP may set an awake duration field of the wakeup confirm frame as 0 and transmit the same. Accordingly, the AP 1010 may terminate the TXOP at an early stage and allow the STA 1020 to be changed into a dose state early.

Instead of the wakeup confirm frame set as described above, in order to stop communication between the AP and/or the STA and make the STA switch to a dose state, the AP 1010 may transmit a data frame (or Null frame) including an end of service period (EOSP) bit of the QoS control field set to be 1. Through this, the AP 1010 may explicitly stop the service period.

Setting of the period of ALTT may be requested by the STA to the AP. The STA may maintain a CPU, a memory, an I/O, and the like, in a low power state during the dose state. When the STA receives a data frame while operating in the low power state, a delay time may be required to operate the system by a normal clock cycle.

A time required for normally operating a upper layer function corresponds to a system specific parameter, and the STA may transmit such a parameter as capability information to the AP.

FIG. 12 is a block diagram showing a format of an ALTT information element according to an embodiment of the present invention.

With reference to FIG. 12, the ALTT information element 1200 may include an element ID field 1210, a length field 1220, and an ALTT field 1230.

The element ID field 1210 may be set to indicate that a corresponding information element is the ALTT information element 1200. The length field 1220 may be set to indicate a length of the ALTT information element 1200.

The ALTT field 1230 may be set to be a value in relation to an ALTT period requested by the AP and/or the STA. In detail, the ALTT field 1230 may be set to indicate a time value required for normally operating an expected application layer system of its own. The ALTT field 1230 may be set to indicate a time using an OFDM symbol duration as a unit.

The ALTT information element 1200 may be included in an association request frame or a re-association request frame transmitted when the AP and the STA are associated or re-associated.

Meanwhile, in order to prevent a channel occupancy by a different STA during the ALTT interval, a method of transmitting an aggregate-MPDU (A-MPDU), rather than transmitting a Null frame, may be proposed.

FIG. 13 is a view showing an example of a procedure for exchanging data frames employing an embodiment of the present invention.

With reference to FIG. 13, an STA 1320 is changed into an awake state and transmits a wakeup poll frame to the AP 1310 (S1310).

The AP 1310 transmits a wakeup confirm frame to the STA 1320 in response to the wakeup poll frame (S1320). When there is a buffered frame with respect to the STA 1320, the AP 1310 may transmit a wakeup confirm frame including an awake duration field set to have other value than 0.

In transmitting data frame(s) to the STA 1320, the AP 1310 transmits an A-MPDU. In configuring the A-MPDU, the AP 1310 pads a Null subframe to an A-MPDU subframe in consideration of an ALTT for the STA 1320.

While receiving the A-MPDU subframe(s), the STA 1320 may operate in an awake state, and it may switch to a dose state, starting from a point in time when a Null subframe starts to be received (S1340).

The STA 1320 is changed into an awake state at a timing when the transmission of the A-MPDU is terminated (S1350), and transmits an ACK frame (or a block ACK frame) to the AP 1310 in response to the A-MPDU (S1360). Subsequently, when the STA 1320 wants to transmit data frame(s) to the AP 1310, it may perform signaling thereon through an ACK frame (or Block ACK frame). By setting a More Data Bit in a frame control field of the ACK frame (or the Block ACK frame), the STA may perform signaling that there is a data frame to be transmitted. In this case, the STA 1320 may transmit the data frame(s) to the AP 1310 (S1370), and the data frame(s) may be transmitted in the A-MPDU format.

The AP 1310 may transmit an ACK frame (or Block ACK frame) to the STA 1320 in response to the A-MPDU transmitted by the STA 1320 (S1380).

In order for the STA 1320 to be changed into the dose state before the termination of the TXOP interval, the AP 1310 must stop the service period. Namely, signaling for the AP 1310 to stop communication with the STA 1320 and make the STA 1320 switch to a dose state is required. To this end, the AP 1310 may transmit a wakeup confirm frame in which the awake duration field is set to be 0 to the STA 1320. Or, the AP 1310 may transmit a data frame (or Null frame) including an EOSP bit of the QoS control field set to be 1 to the STA 1320.

FIG. 14 is a schematic block diagram of a wireless device implementing an embodiment of the present invention.

With reference to FIG. 14, a wireless device 1400 includes a processor 1410, a memory 1420, and a transceiver 1430. The transceiver 1430 transmits and/or receives a radio signal and implements a physical layer of IEEE 802.11. The processor 1410 is functionally connected with the transceiver 1430 and configured to transmit and receive a frame according to a power save mode according to an embodiment of the present invention. The processor 1410 may be configured to implement a MAC layer and/or a PHY layer implementing the embodiment of the present invention illustrated in FIGS. 7 and 13.

The processor 1410 and/or the transceiver 1430 may include an application-specific integrated circuit (ASIC), a separate chipset, a logic circuit, and/or a data processing unit. When the embodiment of the present invention is implemented in software, the aforementioned methods can be implemented with a module (i.e., process, function, etc.) for performing the aforementioned functions. The module may be stored in the memory 1420 and may be performed by the processor 1410. The memory 1420 may be located inside or outside the processor 1410, and may be coupled to the processor 1410 by using various well-known means.

The invention claimed is:

1. A method for providing a power save mode in which a station transitions between an awake state and a doze state in a wireless local area network (WLAN) system, the method comprising:

after waking up into the awake state, receiving, by the station, a beacon frame including a traffic indication map (TIM) element from an access point;

after checking that the TIM element indicates that there is buffered traffic for the station, contending, by the station, for a channel by transmitting a poll frame to the access point after waking up into the awake state, wherein the poll frame is a wakeup poll frame including a duration field indicating a time duration used for transmitting data frames from the station to the access point;

in response to the poll frame, receiving, by the station, a confirm frame from the access point;

after receiving the confirm frame, remaining, by the station, in the awake state until the end of a current transmission opportunity (TXOP), wherein the TXOP is an interval of time when the station has a right to initiate frame exchange sequences onto a wireless medium, wherein information on the TXOP is acquired from the access point;

exchanging a plurality of data frames between the station and the access point within the current TXOP; and if an end frame having a bit that is set to a value indicating an end of transmission is received by the station within the current TXOP, transitioning, by the station, from the awake state to the doze state.

2. The method of claim 1, wherein the step of exchanging the plurality of data frames between the station and the access point includes:

receiving, by the station, at least one downlink data frame from the access point within the current TXOP; and transmitting, by the station, at least one uplink data frame to the access point within the current TXOP.

3. The method of claim 1, wherein the plurality of data frames includes a plurality of Physical layer convergence procedure Protocol Data Units (PPDUs).

4. The method of claim 1, wherein a second station cannot exchange a data frame with the access point during the exchange of the plurality of data frames between the station and the access point.

5. A station for providing a power save mode in which the station transitions between an awake state and a doze state in a wireless local area network (WLAN) system, the station comprising:

a processor; and a memory operatively coupled with the processor and storing instructions that when executed by the processor cause the station to:

after waking up into the awake state, receive a beacon frame including a traffic indication map (TIM) element from an access point;

after checking that the TIM element indicates that there is buffered traffic for the station, contend for a channel by transmitting a poll frame to the access point after waking up into the awake state, wherein the poll frame is a wakeup poll frame including a duration field indicating a time duration used for transmitting data frames from the station to the access point;

in response to the poll frame, receive a confirm frame from the access point;

after receiving the confirm frame, remain in the awake state until the end of a current transmission opportunity (TXOP), wherein the TXOP is an interval of time when the station has a right to initiate frame exchange sequences onto a wireless medium, wherein information on the TXOP is acquired from the access point;

exchange a plurality of data frames between the station and the access point within a the current TXOP; and if an end frame having a bit that is set to a value indicating an end of transmission is received by the station within the current TXOP, transition, by the station, from the awake state to the doze state.

6. The station of claim 5, wherein the instruction to exchange the plurality of data frames between the station and the access point comprises instructions to:
receive at least one downlink data frame from the access point within the current TXOP; and
transmit at least one uplink data frame to the access point within the current TXOP.

7. The station of claim 5, wherein the plurality of data frames includes a plurality of Physical layer convergence procedure Protocol Data Units (PPDUs).

8. The station of claim 5, wherein a second station cannot exchange a data frame with the access point during the exchange of the plurality of data frames between the station and the access point.

\* \* \* \* \*